United States Patent [19]

Sardisco

[11] Patent Number: 4,942,051
[45] Date of Patent: Jul. 17, 1990

[54] METHOD FOR SEPARATION OF DEFECTS FROM CITRUS JUICE

[75] Inventor: Gioacchino Sardisco, Sao Paulo, Brazil

[73] Assignee: FMC Corporation, Chicago, Ill.

[21] Appl. No.: 305,126

[22] Filed: Feb. 2, 1989

[51] Int. Cl.$^5$ ............................................... A23L 2/00
[52] U.S. Cl. .................................... 426/489; 99/495; 426/495
[58] Field of Search ................. 426/489, 495; 99/495, 99/496; 100/100, 130; 210/805, 806, 196

[56] References Cited

U.S. PATENT DOCUMENTS 3,301,685  1/1967  Harwell ................................ 426/489
4,794,013  12/1988  Gresch ................................. 426/489

Primary Examiner—George Yeung
Attorney, Agent, or Firm—L. B. Guernsey; R. C. Kamp; R. B. Megley

[57] ABSTRACT

An inexpensive method for extracting high quality juice from fruit while obtaining a high yield. The unfinished products are pressed in a small screen finisher to obtain a finished liquid and a wet pulp. The wet pulp is hard pressed in a large screen finisher to produce a pulpy liquid and a dry pulp and the pulpy liquid is recycled through the small screen finisher to produce a finished liquid.

14 Claims, 2 Drawing Sheets

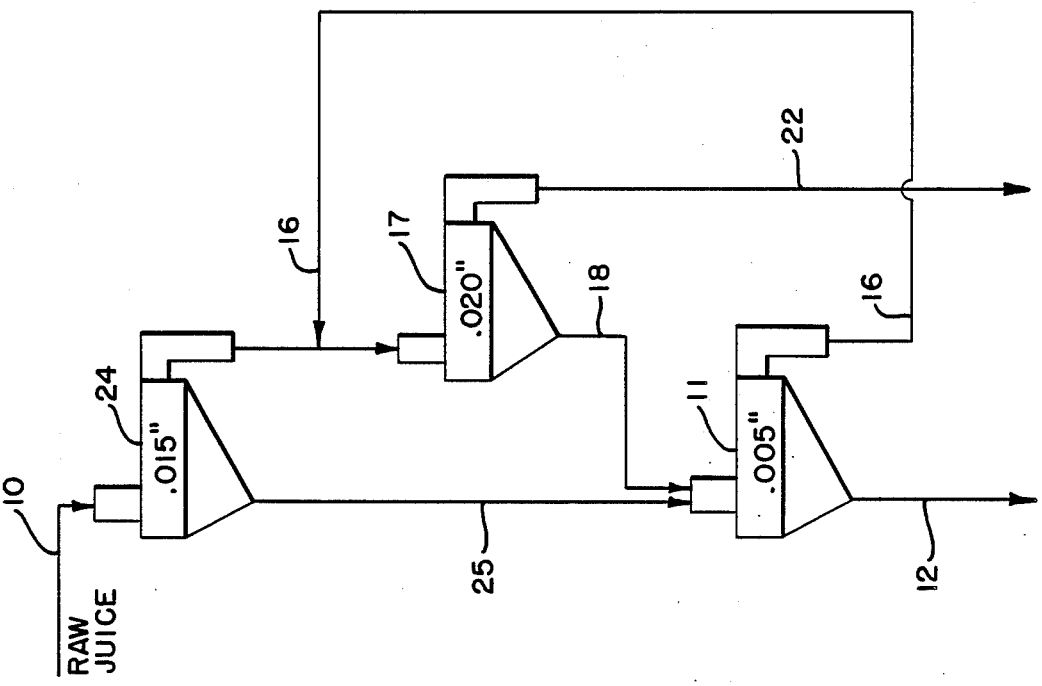
FIG_2
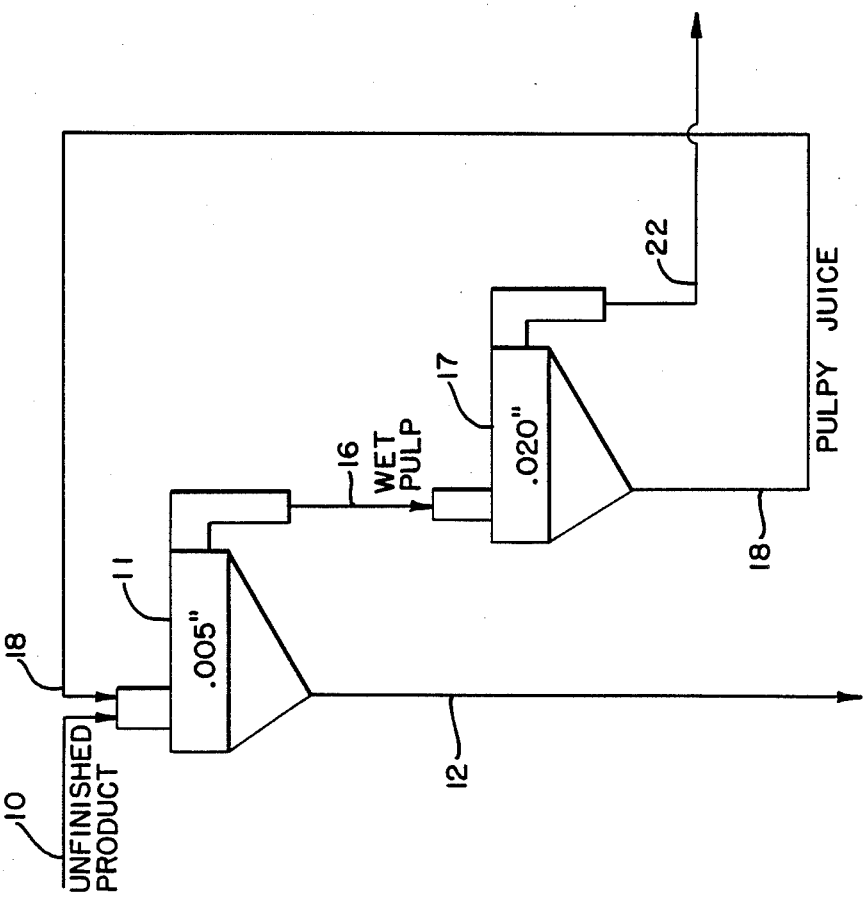
FIG_1

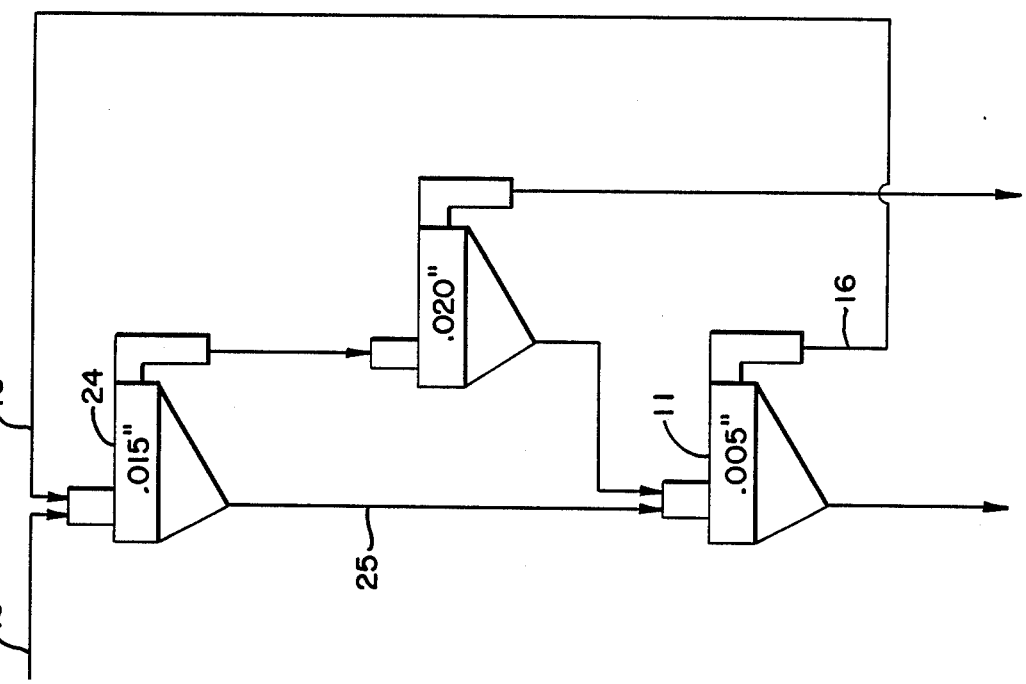
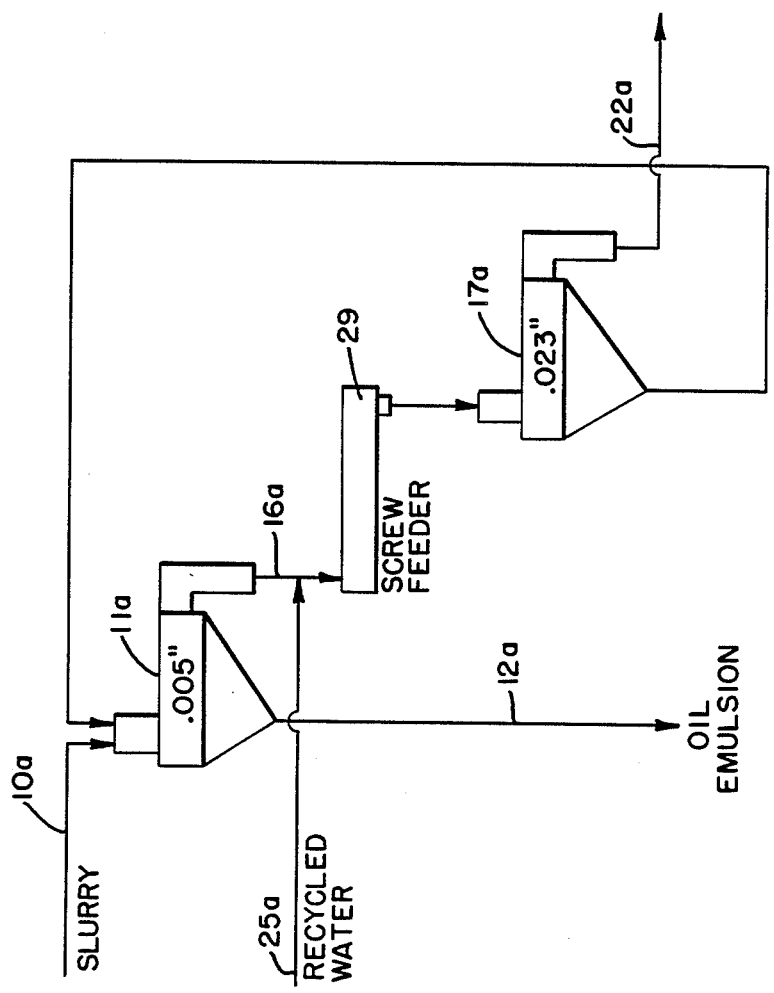

METHOD FOR SEPARATION OF DEFECTS FROM CITRUS JUICE

BACKGROUND OF THE INVENTION

The present invention relates to a method of extracting juice from fruit, and more particularly, to an improved and inexpensive method for extracting high quality juice from fruit.

The complete commercial processing of citrus fruit to obtain juice therefrom today includes the dejuicing and discharging of the pulp and internal membranes of the fruit, the breaking up and ejecting of the peel, the extracting and collecting of the peeled oil, and the separate extracting and collecting of the fruit juice.

In a typical extractor a whole unpeeled citrus fruit is placed between two cups, each of which is formed by a plurality of circumferentially spaced fingers and one of which is provided with a passage to allow discharge of juice and pulp from the fruit. The fingers of the upper and lower cup are arranged in an interdigitating relationship so that as cups are brought together, the cavity between the cups is progressively reduced to squeeze juice from fruit within the cavity. The peel of the fruit is shredded and ejected through an annular opening adjacent to the upper central portion of the upper cup. The juice-bearing material of the fruit is forced downwardly through the passage in the lower cup and into a perforated strainer tube which communicates with the lower cup. As the fruit is squeezed between the cups, an orifice tube is forced upwardly within the strainer tube to exert pressure on the juice-bearing material within the strainer tube to express the raw juice through the perforations therein. The raw juice expressed through the strainer tube is collected within a sump or manifold which extends transversely of the machine through the lower cup assemblies.

The raw juice contains a certain amount of solids such as peel fragments and juice sacs which need to be separated from the raw juice to produce high grade finished juice. One method for obtaining high grade juice is to convey the raw juice through a finisher and refine the juice in a centrifuge. The centrifuge is extremely expensive and entails a high operating cost.

SUMMARY OF THE INVENTION

The present invention discloses an improved and inexpensive method of obtaining a high quality finished citrus juice at a considerable reduction in cost while obtaining a high juice yield. The method includes the steps of pressing the unfinished products in a small screen finisher to produce a finish liquid and a wet pulp, pressing the wet pulp in a large screen finisher to produce a pulpy liquid and a dry pulp, and recycling the pulpy liquid through the small screen finisher to produce a finished liquid. The present invention can also be used in the processing of other fruit and vegetable juices, and in the separation of liquids and solids in water and waste treatment.

BRIEF DESCRIPTION OF THE DRAWINGS

FIG. 1 is a schematic diagram of a system for obtaining a finished liquid from raw juice using double pressing.

FIG. 2 is a schematic diagram of a system for obtaining a finished liquid from raw juice using triple pressing.

FIG. 3 is a schematic diagram of a system for obtaining peel oil from slurry using double processing.

FIG. 4 is a schematic diagram of another system for obtaining a finished liquid from raw juice using triple pressing.

DESCRIPTION OF THE PREFERRED EMBODIMENT

A method and apparatus for producing a finished liquid from an unfinished product using a double processing system is disclosed in FIG. 1. The unfinished product can be raw juice and the finished product can be high quality citrus juice, or the unfinished product can be slurry and the finished product can be peel oil emulsion. When raw juice from a juice extractor (not shown) is transported on an input line 10 to a small screen finisher 11 the finisher provides finished juice to an output line 12 and discharges wet pulp to a pulp output 16. The small or fine screen finisher 11 may have a screen size on the order of 0.005" as noted in the drawings, and obviously the finished juice in line 12 will contain no pulp or other particles larger than the screen size of the finisher. The raw juice is pressed lightly in finisher 11 to insure a minimum of pulp in the finished juice. This causes the wet pulp to contain a relatively large amount of juice. The wet pulp is then pressed tightly in a coarse screen finisher 17 which provides pulpy juice to an output line 18 and provides relatively dry pulp to a pulp output 22. The coarse screen finisher 17 may have a screen size on the order of 0.020" as noted in FIGS. 1, 2, and 4, or 0.023" as shown in FIG. 3, whereby pulpy liquid therefrom in line 18 will contain particles large enough in size to have just passed through the coarse screen of finisher 17. The pulpy juice from finisher 17 is returned to small screen finisher 11 which removes most of the pulp and provides high quality juice to output line 12. By using only two screen finishers high quality juice can be provided and a relatively high juice yield can be obtained at a relatively low cost.

The juice recovery system disclosed in FIG. 2 includes an additional step in the product separation system of FIG. 1. A third screen finisher 24 having a screen size on the order of 0.015" as shown is connected between input line 10 and small screen finisher 11 to remove the larger pieces of pulp and peel from raw juice produced by a juice extractor (not shown). Unfinished juice from screen finisher 24 is coupled by a line 25 to small screen finisher 11 which provides high quality juice to output line 12 and wet pulp to finisher 17. Finisher 17 provides pulpy juice and dry pulp as described above.

The juice recovery system disclosed in FIG. 4 is similar to the system of FIG. 2 except the pulpy juice from a small screen finisher 11 is returned by line 16 to finisher 24 for additional processing.

Details of a method and apparatus for producing a peel oil emulsion from slurry using double pressing is disclosed in FIG. 3. Slurry from a juice extractor (not shown) is transported on input line 10a to small screen finisher 11a where the oil emulsion is separated from the peel and pulp. The oil emulsion is discharged on output line 12a and wet peel and pulp from line 16a is mixed with recycled water from a line 25a and transported by a screw feeder 29 to a coarse finisher 17a. Finisher 17a squeezes out additional oil emulsion which is feed back to finisher 11a for refinement. Solid feed meal from finisher 17a is discharged on line 22a.

The triple pressing systems of FIGS. 2 and 4 can also be used to reclaim peel oil emulsion by including a screw feeder in line 16 at the output of finisher 11.

The present invention employs double and triple pressing systems to produce high quality citrus juice and to recover peel oil by recycling a partially finished product through a small screen finisher. These systems reduce the cost of producing high quality products. Other possible applications include the processing of various fruit and vegetable juices, and in the separation of liquids and solids in water and waste treatment plants.

Although the best mode contemplated for carrying out the present invention has been herein shown and described, it will be apparent that modification and variation may be made without departing from what is regarded to be the subject matter of the invention.

What is claimed is:

1. A method for producing a finished liquid fruit product from a stream of unfinished products comprising the steps of:
   pressing the unfinished products in a small screen finisher having a screen size on the order of 0.005" to produce a finished liquid and a wet pulp, said finished liquid containing first size particles smaller than the screen size of the said finisher and said wet pulp containing particles larger than the screen size of the said finisher;
   pressing the wet pulp in a coarse screen finisher to produce a pulpy liquid and a dry pulp, said pulpy liquid containing second size particles smaller than the screen size of the said coarse finisher and said dry pulp containing particles larger than the screen size of the said coarse finisher, said second size particles being a predetermined amount substantially larger than said first size particles, and;
   recycling the pulpy liquid through the small screen finisher to produce a finished liquid.

2. A method for producing a finished liquid as defined in claim 1 wherein said unfinished products include raw juice, and said finished liquid includes finished fruit juice.

3. A method for producing a finished liquid as defined in claim 1 wherein said unfinished products includes slurry from a juice extractor, and said finished liquid includes a peel oil emulsion.

4. A method for producing a finished liquid as defined in claim 1 including the further steps of:
   receiving a raw product from a juice extractor;
   pressing the raw product in a third finisher to produce a raw pulp and produce the stream of unfinished products; and
   feeding the raw pulp to the coarse screen finisher to produce said pulpy liquid and said pulp.

5. A method for producing a finished liquid fruit product from a stream of unfinished products comprising the steps of:
   pressing the unfinished products lightly in a small screen finisher having a screen size on the order of 0.005" to produce a finished liquid and a wet pulp, said finished liquid containing first size particles smaller than the screen size of the said finisher and said wet pulp containing particles larger than the screen size of the said finisher;
   pressing the wet pulp tightly in a coarse screen finisher to produce a pulpy liquid and a dry pulp, said pulpy liquid containing second size particles smaller than the screen size of the said coarse finisher and said dry pulp containing particles larger than the screen size of the said coarse finisher, said second size particles being a predetermined amount substantially larger than said first size particles;
   discarding the dry pulp; and
   recycling the pulpy liquid through the small screen finisher to produce a finished liquid.

6. A method for producing a finished liquid as defined in claim 1 wherein said unfinished products include raw juice, said dry pulp includes a plurality of solids, and said finished liquid includes finished fruit juice.

7. A method for producing a finished liquid fruit product from a stream of unfinished products comprising the steps of:
   pressing the unfinished products in a small screen finisher having a screen size on the order of 0.005" to produce a finished liquid and a wet pulp, said finished liquid containing first size particles smaller than the screen size of the said finisher and said wet pulp containing particles larger than the screen size of the said finisher;
   pressing the wet pulp in a coarse screen finisher to produce a pulpy liquid and a dry pulp, said pulpy liquid containing second size particles smaller than the screen size of the said coarse finisher and said dry pulp containing particles larger than the screen size of the said coarse finisher, said second size particles being substantially four times as large as said first size particles; and
   recycling the pulpy liquid through the small screen finisher to produce a finished liquid.

8. A method for producing a finished liquid as defined in claim 7 wherein said unfinished products include raw juice, and said finished liquid includes finished fruit juice.

9. A method for producing a finished liquid as defined in claim 7 wherein said unfinished products includes slurry from a juice extractor, and said finished liquid includes a peel oil emulsion.

10. A method for producing a finished liquid as defined in claim 7 including the further steps of:
    receiving the raw product from a juice extractor;
    pressing the raw product in a third finisher to produce a raw pulp and produce the stream of unfinished products; and
    feeding the raw pulp to the coarse screen finisher to produce said pulpy liquid and said dry pulp.

11. A method for producing a finished liquid fruit product from a stream of unfinished products comprising the steps of:
    pressing the unfinished products lightly in a small screen finisher having a screen size on the order of 0.005" to produce a finished liquid and a wet pulp, said finished liquid containing first size particles smaller than the screen size of the said finisher and said wet pulp containing particles larger than the screen size of the said finisher;
    pressing the wet pulp tightly in a coarse screen finisher to produce a pulpy liquid and a dry pulp, said pulpy liquid containing second size particles smaller than the screen size of the said coarse finisher and said dry pulp containing particles larger than the screen size of the said coarse finisher, said second size particles being substantially four times as large as said first size particles;
    discarding the dry pulp; and
    recycling the pulpy liquid through the small screen finisher to produce a finished liquid.

12. A method for producing a finished liquid as defined in claim 7 wherein said unfinished products include raw juice, said dry pulp includes a plurality of solids, and said finished liquid includes finished fruit juice.

13. A method as defined in claim 1 wherein the step of pressing the wet pulp in a coarse screen finisher includes the step of providing a screen size on the order of 0.020".

14. A method as defined in claim 5 wherein the step of pressing the wet pulp in a coarse screen finisher includes the step of providing a screen size on the order of 0.020".

* * * * *